United States Patent
Hugenberg et al.

(10) Patent No.: US 9,957,398 B2
(45) Date of Patent: May 1, 2018

(54) COMPOSITION FOR THE PRODUCTION OF A COATING WITH HIGH ADHESIVE STRENGTH AND SCRATCH RESISTANCE

(71) Applicant: CARL ZEISS VISION INTERNATIONAL GMBH, Aalen (DE)

(72) Inventors: Norbert Hugenberg, Aalen (DE); Bin Peng, Aalen (DE); Joerg Puetz, Aalen (DE)

(73) Assignee: Carl Zeiss Vision GMBH, Aalen (DE)

( * ) Notice: Subject to any disclaimer, the term of this patent is extended or adjusted under 35 U.S.C. 154(b) by 739 days.

(21) Appl. No.: 13/644,770

(22) Filed: Oct. 4, 2012

(65) Prior Publication Data

US 2013/0274381 A1    Oct. 17, 2013

Related U.S. Application Data

(60) Provisional application No. 61/543,018, filed on Oct. 4, 2011.

(30) Foreign Application Priority Data

Oct. 4, 2011  (DE) .......................... 10 2011 083 960

(51) Int. Cl.
*C09D 7/00* (2018.01)
*C09D 7/12* (2006.01)
(Continued)

(52) U.S. Cl.
CPC ........... *C09D 7/1233* (2013.01); *C08G 77/14* (2013.01); *C09D 183/04* (2013.01); *C09D 183/06* (2013.01)

(58) Field of Classification Search
CPC ...................................................... C08L 63/00
(Continued)

(56) References Cited

U.S. PATENT DOCUMENTS 3,986,997 A  10/1976  Clark
4,355,135 A  10/1982  January
(Continued)

FOREIGN PATENT DOCUMENTS

DE    19587317 A1    6/2000
DE    19857317       6/2000
(Continued)

OTHER PUBLICATIONS

European Patent Office, Opposition to a European Patent, Notification dated Jan. 16, 2017, for European Patent No. 2578649.

*Primary Examiner* — Megan McCulley
(74) *Attorney, Agent, or Firm* — Price Heneveld LLP; James K. Leonard

(57) ABSTRACT

A composition including:
(a) a silane derivative of the formula (I)

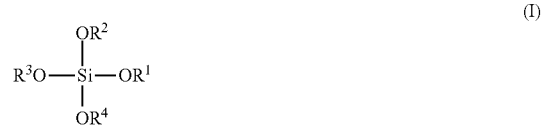

in which $R^1$, $R^2$, $R^3$ and $R^4$, which may be the same or different, are selected from alkyl, acyl, alkyleneacyl, cycloalkyl, aryl and alkylenearyl, and/or a hydrolysis and/or condensation product of the silane derivative of the formula (I);
(b) a silane derivative of the formula (II)

$$R^6R^7_{3-n}Si(OR^5)_n \quad \text{(II)}$$

in which $R^5$ is an alkyl, acyl, alkyleneacyl, cycloalkyl, aryl or alkylenearyl group, $R^6$ is an organic radical containing an epoxide group, $R^7$ is an unsubstituted or substituted alkyl, (Continued)

cycloalkyl, aryl or alkylenearyl group, n is 2 or 3, and/or a hydrolysis and/or condensation product of the silane derivative of the formula (II);
(c) a colloidal inorganic oxide, fluoride or oxyfluoride;
(d) an epoxide compound having at least two epoxide groups, and
(e) a catalyst system.

20 Claims, 1 Drawing Sheet

(51) Int. Cl.
  *C09D 183/06* (2006.01)
  *C08G 77/14* (2006.01)
  *C09D 183/04* (2006.01)
(58) Field of Classification Search
  USPC .......................................................... 523/456
  See application file for complete search history.

(56) References Cited

U.S. PATENT DOCUMENTS

| | | | |
|---|---|---|---|
| 5,104,692 | A | 4/1992 | Belmares |
| 5,116,644 | A | 5/1992 | Asai et al. |
| 5,322,888 | A | 6/1994 | Kato et al. |
| 5,789,476 | A | 8/1998 | Iryo et al. |
| 6,057,039 | A | 5/2000 | Takeshita et al. |
| 6,537,672 | B1 | 3/2003 | Dittfurth et al. |
| 2001/0049023 | A1 | 12/2001 | Havey et al. |
| 2008/0075848 | A1 | 3/2008 | Kurata et al. |
| 2010/0029804 | A1* | 2/2010 | Nakayama et al. .......... 522/172 |
| 2010/0035067 | A1 | 2/2010 | Colton |
| 2012/0115991 | A1 | 5/2012 | Hugenberg et al. |

FOREIGN PATENT DOCUMENTS

| | | |
|---|---|---|
| DE | 69531661 | 8/2004 |
| DE | 69531661 T2 | 8/2004 |
| DE | 102010028661 | 11/2011 |
| EP | 2213623 A1 | 8/2010 |
| EP | 2385086 A1 | 11/2011 |
| JP | S59115366 A | 7/1984 |
| WO | 2008087741 A1 | 7/2008 |
| WO | WO 2008/087741 | 7/2008 |

* cited by examiner

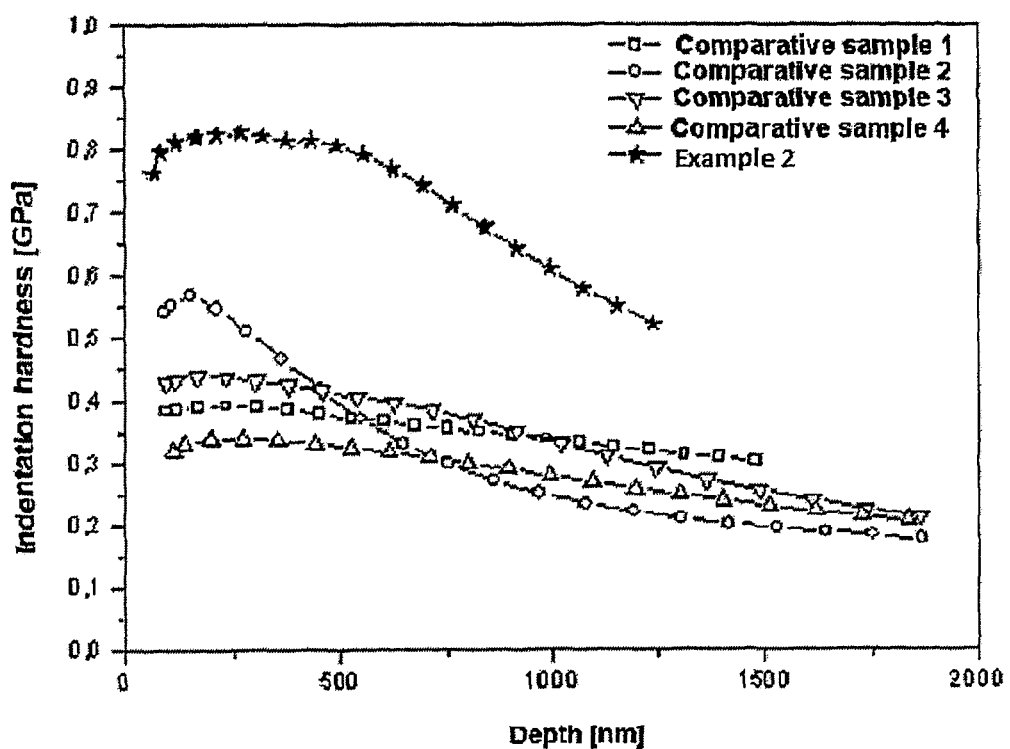

COMPOSITION FOR THE PRODUCTION OF A COATING WITH HIGH ADHESIVE STRENGTH AND SCRATCH RESISTANCE

CROSS-REFERENCE TO RELATED APPLICATIONS

This application claims priority to and the benefit of U.S. Provisional Patent Application Ser. No. 61/543,018, entitled "Composition for the Production of a Coating with High Adhesive Strength and Scratch Resistance," filed on Oct. 4, 2011, the entire disclosure of which is incorporated herein by reference. This application further claims priority to German Application No. DE 10 2011 083 960.7, filed on Oct. 4, 2011, also entitled "Composition for the Production of a Coating with High Adhesive Strength and Scratch Resistance," the entire disclosure of which is incorporated herein by reference.

BACKGROUND OF THE INVENTION

In the field of optics and optoelectronics, transparent polymers are increasingly being used since these materials offer advantages in terms of fracture resistance and weight saving. It is also possible in the field of precision optics to produce components with more complex three-dimensional geometry, such as objectives or lenses, in large numbers in a relatively simple manner.

Illustrative polymer materials which are currently being used in the field of optics are polymethyl methacrylate, polycarbonate, diethylene glycol bisallylcarbonate (trade name: CR39®), or else specific polythiourethane-based polymers of high refractive index.

One disadvantage of these polymer materials is the relatively low surface hardness and scratch resistance thereof.

A known approach to improving scratch resistance involves applying a surface coating via a sol-gel process. For example, tetraalkoxysilanes are used, which are hydrolysed under suitable conditions and then lead through condensation of the silanol groups formed by the hydrolysis to a three-dimensionally crosslinked silicate structure.

As explained above, a number of different polymers are now being used as substrates in the field of optical materials. Due to their particular chemical structure, these polymer substrates may differ significantly in terms of their surface properties, which can in turn have a significant influence on the adhesive strength of a coating composition on the substrate surface.

Coating compositions of this type ideally have good adhesive strength on different polymer substrate surfaces and high scratch resistance. The coating compositions also should ideally satisfy a number of further requirements. The coating should, inter alia, have a low tendency to crack formation under thermal stress and a high resistance to alkalis and/or acids. In implementing this profile of requirements, however, it should be taken into account that the abovementioned properties frequently oppose one another, and improvement in one of these properties can therefore be achieved only at the cost of another property.

In order to increase the flexibility of the silicate network and thus to reduce the tendency to crack formation under thermal stress, it is customary, for example, to use the tetraalkoxysilanes in combination with organoalkoxysilanes (i.e. silanes which, apart from alkoxy groups, also have one or more organic radicals bonded directly to silicon atom). The organic-inorganic network structure obtained as a result has higher flexibility and base stability, but at the cost of a low hardness compared to the purely inorganic silicate network.

U.S. Pat. No. 3,986,997 describes an aqueous composition which comprises colloidal $SiO_2$ and an organotrialkoxysilane, for example methyltrimethoxysilane, and/or hydrolysis and/or condensation products of this organotrialkoxysilane.

In addition, it is also known from the prior art that tetraalkoxysilane or colloidal $SiO_2$ and an organoalkoxysilane wherein the organic radical contains an epoxide group can be used together with a dicarboxylic acid or a dicarboxylic anhydride.

For instance, US 2001/0049023 A1 discloses a composition for the coating of a substrate based on an aqueous-organic solvent mixture which comprises (i) an organoalkoxysilane with epoxide functionality or the hydrolysis and/or condensation products thereof, (ii) a tetraalkoxysilane or the hydrolysis and/or condensation products thereof and (iii) a dicarboxylic acid or a dicarboxylic anhydride.

The use of tetraalkoxysilane or colloidal $SiO_2$ and an organoalkoxysilane wherein the organic radical contains an epoxide group in combination with a dicarboxylic acid or a dicarboxylic anhydride is also discussed in U.S. Pat. Nos. 4,355,135 and 5,322,888.

WO 2008/087741 discloses a coating composition which comprises (A) a poly(methyl)glycidyl ether compound with an aliphatic R1 radical, (B) a silsesquioxane, (C) an alkoxy compound, (D) or organoalkoxy compound wherein the organic radical bonded to the silicon atom has a cationically polymerizable group, for example an epoxide group, and (E) a photopolymerization catalyst. The compositions described in WO 2008/087741 are free of solvents.

SUMMARY OF THE INVENTION

An aspect of the present invention includes a composition configured to produce a coating. The composition includes a first silane composition and a second silane composition. The first silane composition is chosen from the group consisting of: a silane derivative of the formula (I)

in which: $R^1$, $R^2$, $R^3$ and $R^4$, which may be the same or different, are selected from an alkyl, an acyl, an alkyleneacyl, a cycloalkyl, an aryl and an alkylenearyl, which may optionally be substituted; a hydrolysis product of the silane derivative of the formula (I); and a condensation product of the silane derivative of the formula (I), and mixtures thereof. The second silane composition is chosen from: (a) a silane derivative of the formula (II)

in which: $R^5$ is an unsubstituted or substituted alkyl, acyl, alkyleneacyl, cycloalkyl, aryl or alkylenearyl group, $R^6$ is an organic radical containing an epoxide group, $R^7$ is an unsubstituted or substituted alkyl, cycloalkyl, aryl or alkylenearyl group, n is 2 or 3; (b) a hydrolysis product of the silane derivative of the formula (II); (c) condensation product of the silane derivative of the formula (II); and (d) mixtures thereof. The composition, in addition to the first and second silane compounds, further includes: a colloidal inorganic oxide, fluoride or oxyfluoride; an epoxide compound having at least two epoxide groups; and a catalyst system that includes a Lewis acid and a thermolatent Lewis acid-base adduct.

Yet another aspect of the present invention includes a process for coating a substrate. The process includes the steps of providing a composition as described in the previous paragraph including a first silane composition; a second silane composition; a colloidal inorganic oxide; an epoxide compound having at least two epoxide groups; and a catalyst system that includes a Lewis and a thermolatent Lewis acid base adduct; applying the composition to a substrate; and treating the substrate at a temperature in the range from 75° C. to 150° C. to cure the coating.

Another aspect of the present invention includes an article comprised of a substrate; and a coating on the substrate surface, where the coating includes the composition described above having a first silane composition; a second silane composition; a colloidal inorganic oxide; an epoxide compound having at least two epoxide groups; and a catalyst system that includes a Lewis and a thermolatent Lewis acid base adduct.

These and other features, advantages, and objects of the present invention will be further understood and appreciated by those skilled in the art by reference to the following specification, claims, and appended drawings.

BRIEF DESCRIPTION OF THE DRAWING

The foregoing summary, as well as the following detailed description of the invention, will be better understood when read in conjunction with the appended drawing.

FIG. 1 is a chart of indentation hardness as a function of indentation depth.

DETAILED DESCRIPTION

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

It is an object of the present invention to provide a composition from which it is possible to produce a coating which has good adhesion on different substrates and additionally has high scratch resistance with a simultaneously low tendency to crack formation under thermal stress, and high resistance to alkalis and/or acids.

This object is achieved by the provision of a composition for the production of a coating, comprising:
(a) a silane derivative of the formula (I)

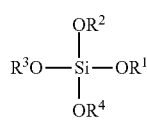  (I)

in which $R^1$, $R^2$, $R^3$ and $R^4$, which may be the same or different, are selected from alkyl, acyl, alkyleneacyl, cycloalkyl, aryl and alkylenearyl, which may optionally be substituted, and/or a hydrolysis and/or condensation product of the silane derivative of the formula (I),
(b) a silane derivative of the formula (II)

  (II)

in which $R^5$ is an unsubstituted or substituted alkyl, acyl, alkyleneacyl, cycloalkyl, aryl or alkylenearyl group, $R^6$ is an organic radical containing an epoxide group, $R^7$ is an unsubstituted or substituted alkyl, cycloalkyl, aryl or alkylenearyl group, n is 2 or 3, and/or a hydrolysis and/or condensation product of the silane derivative of the formula (II),
(c) a colloidal inorganic oxide, fluoride or oxyfluoride,
(d) an epoxide compound having at least two epoxide groups,
(e) a catalyst system comprising:
   a Lewis acid and
   a thermolatent Lewis acid-base adduct.

As will be explained in more detail hereinafter, the use of a composition comprising components (a) to (e) enables the production of a coating which has very good adhesive strength on different polymer substrates and also features high scratch resistance, and also a high alkali resistance and a low tendency to crack formation on the substrate.

As already stated above, the inventive composition comprises, as component (a), a silane derivative of the formula (I) and/or a hydrolysis and/or condensation product of the silane derivative of the formula (I).

The term "hydrolysis and/or condensation product of the silane derivative of the formula (I)" expresses the fact that it is also possible in the context of the present invention that the silane derivative (I) has already been at least partly hydrolysed to form silanol groups, and a certain degree of crosslinking has also already taken place through condensation reaction of these silanol groups.

When $R^1$, $R^2$, $R^3$ and/or $R^4$ is/are an alkyl group, this is preferably a $C_{1-8}$-alkyl group, more preferably a $C_{1-4}$-alkyl group, which may optionally be substituted. In this context, examples may include methyl, ethyl, n-propyl, iso-propyl, n-butyl, iso-butyl, tert-butyl, hexyl or octyl.

When $R^1$, $R^2$, $R^3$ and/or $R^4$ is/are an acyl group, this is preferably acetyl, propionyl or butyryl.

When $R^1$, $R^2$, $R^3$ and/or $R^4$ is/are an alkyleneacyl group, this is preferably a $C_{1-6}$-alkyleneacyl group (e.g. —$CH_2$-acyl; —$CH_2$—$CH_2$-acyl; etc.), where the acyl unit is preferably acetyl, propionyl or butyryl.

An alkylene group is understood to mean a divalent alkyl group (i.e., for example, —$CH_2$—; —$CH_2$—$CH_2$—; etc.).

When $R^1$, $R^2$, $R^3$ and/or $R^4$ is/are a cycloalkyl group, this is preferably a cyclohexyl radical which may optionally be substituted.

When $R^1$, $R^2$, $R^3$ and/or $R^4$ is/are an aryl group, this is preferably a phenyl radical which may optionally be substituted.

When $R^1$, $R^2$, $R^3$ and/or $R^4$ is/are an alkylenearyl group, this is preferably a $C_{1-6}$-alkylenearyl radical (e.g. —$CH_2$-aryl; —$CH_2$—$CH_2$-aryl; etc.), where the aryl unit is preferably phenyl which may optionally be substituted.

Preferred silane derivatives of the formula (I) are, for example, tetramethoxysilane, tetraethoxysilane, tetrapropoxysilane, tetraisopropoxysilane, tetrabutoxysilane, tetraisobutoxysilane, tetrakis(methoxyethoxy)silane, tetrakis (methoxypropoxy)silane, tetrakis(ethoxyethoxy)silane, tetrakis(methoxyethoxyethoxy)silane, trimethoxyethoxysilane, dimethoxydiethoxysilane and corresponding derivatives.

These silane derivatives of the formula (I) are common knowledge to the person skilled in the art and are commercially available and/or preparable by standard methods known to those skilled in the art.

The silane derivatives of the formula (I) and/or the hydrolysis and/or condensation products of the silane derivatives of the formula (I) are preferably present in the composition in an amount of 5% by weight to 50% by weight, more preferably of 5% by weight to 20% by weight.

As already stated above, the inventive composition comprises, as component (b), a silane derivative of the formula (II) and/or a hydrolysis and/or condensation product of the silane derivative of the formula (II).

The term "hydrolysis and/or condensation product of the silane derivative (II)" again expresses the fact that it is also possible in the context of the present invention that the silane derivative (II) has already been at least partly hydrolysed to form silanol groups, and a certain degree of crosslinking has also already taken place through condensation reaction of these silanol groups.

With regard to the preferred alkyl, acyl, alkyleneacyl, cycloalkyl, aryl or alkylenearyl groups of the $R^5$ radical, reference may be made to the remarks made above for the $R^1$, $R^2$, $R^3$ and $R^4$ radicals.

In a preferred embodiment, the organic $R^6$ radical containing an epoxide group has 2 to 14 carbon atoms.

Preferably, the epoxide group in the $R^6$ radical is in the form of a glycidoxy group which is preferably bonded to the silicon atom via a $C_{1-10}$-alkylene group, more preferably via a $C_{1-4}$-alkylene group, e.g. ethylene, propylene or butylene, an arylene group, e.g. phenylene, or an alkylene ether group.

In a preferred embodiment, the $R^6$ radical has the following formula (III):

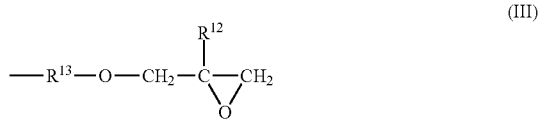

(III)

in which
$R^{12}$ is hydrogen or $C_{1-4}$-alkyl, preferably hydrogen, and
$R^{13}$ is an unsubstituted or substituted $C_{1-10}$-alkylene group, more preferably an unsubstituted or substituted $C_{1-4}$-alkylene group.

As already noted above, an alkylene group is understood to mean a divalent alkyl group (i.e., for example, —$CH_2$—; —$CH_2$—$CH_2$—; etc.).

With regard to the preferred alkyl, cycloalkyl, aryl or alkylenearyl groups for the $R^7$ radical, reference may be made to the remarks made above for $R^1$, $R^2$, $R^3$ and $R^4$.

Preferred silane derivatives of the formula (II) are, for example, 3-glycidoxymethyltrimethoxysilane, 3-glycidoxypropyltrihydroxysilane, 3-glycidoxypropyldimethylhydroxysilane, 3-glycidoxypropyldimethylethoxysilane, 3-glycidoxypropylmethyldiethoxysilane, 3-glycidoxypropyltrimethoxysilane, 3-glycidoxypropyltriethoxysilane, 3-glycidoxypropyldimethoxymethylsilane, 3-glycidoxypropyldiethoxymethylsilane, 2-(3,4-epoxycyclohexyl)ethyltrimethoxysilane, and corresponding derivatives.

These silane derivatives of the formula (II) are common knowledge to those skilled in the art and are commercially available and/or preparable by standard processes known to those skilled in the art.

The silane derivative of the formula (II) and/or the hydrolysis and/or condensation products of the silane derivative (II) is/are preferably present in the composition in an amount of 5% by weight to 50% by weight, more preferably of 5% by weight to 20% by weight.

The weight ratio of the silane derivative (I) or the hydrolysis and/or condensation products thereof relative to the silane derivative (II) can in principle be varied over a wide range.

The weight ratio of the silane derivative (I) and/or the hydrolysis and/or condensation products thereof relative to the silane derivative (II) and/or the hydrolysis and/or condensation products thereof is preferably in the range from 95/5 to 5/95, more preferably in the range from 70/30 to 30/70, even more preferably in the range from 60/40 to 40/60.

As already stated above, the inventive composition comprises, as component (c), a colloidal inorganic oxide, fluoride or oxyfluoride, or a mixture thereof.

The colloidal inorganic oxide, fluoride or oxyfluoride contributes to an increase in scratch resistance through incorporation into the existing network. In addition, selection of suitable oxides, fluorides or oxyfluorides allows the refractive index of the coating to be matched to the refractive index of the substrate.

In a preferred embodiment, the inorganic oxide is selected from $SiO_2$, $TiO_2$, $ZrO_2$, $SnO_2$, $Sb_2O_3$, $Al_2O_3$, $AlO(OH)$ or mixed oxides or mixtures or core-shell structures thereof. The fluoride used may, for example, be $MgF_2$ as a pure component or in a core-shell structure with one of the abovementioned oxides.

The mean particle diameter of the inorganic component should preferably be selected such that the transparency of the coating is not affected. In a preferred embodiment, the colloidal inorganic component has a mean particle diameter in the range from 2 nm to 150 nm, even more preferably from 2 nm to 70 nm. The mean particle diameter is determined by means of dynamic light scattering.

The colloidal inorganic component is preferably present in an amount of 5% by weight to 50% by weight, more preferably of 5% by weight to 25% by weight, based on the total weight of the composition.

As already stated above, the inventive composition comprises, as component (d), an epoxide compound having at least two epoxide groups.

Such epoxide compounds having two or more epoxide groups are known in principle to those skilled in the art.

In a preferred embodiment, the epoxide compound is a polyglycidyl ether compound, more preferably a diglycidyl ether or triglycidyl ether compound.

In a preferred embodiment, the diglycidyl ether compound has the following formula (IV):

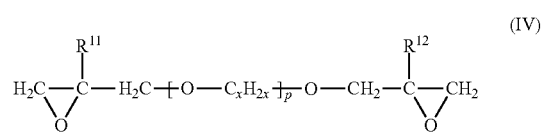

(IV)

in which p is 0 or 1, x=1-10, $R^{10}$ and $R^{11}$, which may be the same or different, are hydrogen or methyl.

When p=0, the two glycidyl groups are joined to one another only via an oxygen atom.

When $R^{10}$ and $R^{11}$ are hydrogen, this is then diglycidyl ether.

Alternatively, p may be 1, in which case x may be 1-10.

The bivalent —$C_xH_{2x}$— group may be a linear bivalent alkylene group or alternatively a branched bivalent alkylene group.

In a preferred embodiment, x=2-8, more preferably 2-6.

In preferred embodiments, the —$C_xH_{2x}$— group may, for example, be the following:

—$CH_2$—$CH_2$—; —$CH_2$—$CH(CH_3)$—; —$CH_2$—$CH_2$—$CH_2$—$CH_2$—;

or

—$CH_2$—$CH_2$—$CH_2$—$CH_2$—$CH_2$—$CH_2$—.

Preferably, $R^{10}$ and $R^{11}$ are each hydrogen.

Preferred epoxide compounds of component (d) may include, for example, diglycidyl ether, ethylene glycol diglycidyl ether, propylene glycol diglycidyl ether, 1,4-butanediol diglycidyl ether and 1,6-hexanediol diglycidyl ether, or mixtures thereof.

In a preferred embodiment, the inventive composition comprises a triglycidyl ether compound which preferably has the following formula (V):

(V)

$$H_2C\underset{O}{\overset{R^{14}}{\underset{|}{\overset{|}{C}}}}-CH_2-O-C_xH_{2x}-\underset{\underset{\underset{\underset{O\diagdown \underset{CH_2}{\overset{|}{C}}-R^{16}}{|}}{CH_2}}{\overset{|}{O}}}{\overset{R^{17}}{\overset{|}{C}}}-C_yH_{2y}-O-CH_2-\underset{O}{\overset{R^{15}}{\underset{|}{\overset{|}{C}}}}CH_2$$

in which $R^{14}$, $R^{15}$ and $R^{16}$, which may be the same or different, are hydrogen or methyl, $R^{17}$ is hydrogen or $C_{1-4}$-alkyl, x=0-3, y=0-3, z=0-3.

In a preferred embodiment, x=1-2, y=1-2 and z=0-1.

Preferably, $R^{17}$ is hydrogen, methyl or ethyl.

Preferably, $R^{14}$, $R^{15}$ and $R^{16}$ are each hydrogen.

In a preferred embodiment, the epoxide compound of the formula (V) is selected from trimethylolpropane triglycidyl ether, triglycidylglycerol, trimethylolethane triglycidyl ether, a prepolymer thereof, or a mixture thereof.

Preferably, the epoxide compound having at least two epoxide groups is present in an amount of 0.1% by weight to 10% by weight, more preferably of 0.5% by weight to 10% by weight, based on the total weight of the composition.

As explained above, the inventive composition comprises a catalyst system for the thermal polymerization of epoxides, comprising:

a Lewis acid and a thermolatent Lewis acid-base adduct.

As will be discussed in more detail below, this combination of a Lewis acid with a thermolatent Lewis acid-base adduct enables very homogeneous crosslinking and hence also constantly high strength over the entire layer thickness.

In the context of the present invention, the term "Lewis acid" is understood in its customary definition familiar to those skilled in the art, and therefore relates to an electrophilic electron pair acceptor compound. Correspondingly, a Lewis base is understood to mean an electron pair donor compound.

The Lewis acids are preferably those which have catalytic activity even at relatively low temperatures, for example at room temperature.

Lewis acids suitable for the thermal polymerization of epoxides are known in principle to those skilled in the art. Examples of suitable Lewis acids for the thermal polymerization of epoxides may include the following: ammonium salts, metal salts (especially of metals from one of groups 1 (i.e. alkali metal salts), 2 (i.e. alkaline earth metal salts) or 13 (preferably Al or B) of the periodic table of the elements), halides of an element of group 13 of the periodic table of the elements (especially $AlX_3$ or $BX_3$ where X is chlorine or fluorine), organic sulphonic acids and amine salts thereof, alkali metal or alkaline earth metal salts, for example alkali metal or alkaline earth metal salts of carboxylic acids, fluoride salts, organotin compounds, or a mixture of two or more of the above-specified Lewis acids.

Preferred metal salts of metals from one of groups 1, 2 and 13 of the periodic table of the elements are, for example, perchlorates or carboxylates (i.e. carboxylic salts).

Preferred Lewis acids are, for example, ammonium perchlorate, magnesium perchlorate, sulphonic acids and salts thereof, and trifluoromethanesulphonic acids and salts thereof.

As a further component, the catalyst system of the inventive composition comprises a thermolatent or thermolabile Lewis acid-base adduct.

Thermolatent or thermolabile catalyst compounds are known in principle to those skilled in the art. Such a thermolatent catalyst compound is understood to mean a compound which has catalytic activity (with regard to the chemical reaction in question) only at relatively high temperatures, while it is essentially still catalytically inactive at room temperature. Only through the supply of sufficient thermal energy is a thermolatent catalyst compound converted to a catalytically active state.

In a preferred embodiment, the thermolatent Lewis acid-base adduct is a metal complex.

The metal complexes may be those which have monodentate or polydentate ligands (i.e. metal chelate complexes).

The metal complex is preferably selected from a metal enolate, especially a metal acetylacetonate, a metal alkoxide, or a metal acetate, or a mixture thereof.

The metal of the metal complex is preferably selected from one of groups 6 (e.g. Cr), 8 (e.g. Fe), 12 (e.g. Zn) and 13 (especially Al) of the periodic table of the elements.

In a preferred embodiment, the metal complex which functions as the thermolatent Lewis acid-base adduct is selected from aluminium acetylacetonate, iron acetylacetonate and zinc acetylacetonate.

The catalyst system is preferably present in an amount in the range from 0.01% by weight to 5% by weight, more preferably in the range from 0.1% by weight to 3% by weight, based on the total weight of the composition.

The weight ratio of Lewis acid to the thermolatent Lewis acid-base adduct can be varied over a wide range. The weight ratio of Lewis acid to thermolatent Lewis acid-base adduct is preferably in the range from 20/1 to 1/2, more preferably from 5/1 to 2/1.

The inventive composition preferably comprises a solvent comprising an alcohol, ether and/or ester.

If the solvent comprises an alcohol, it is preferably selected from alkanol, cycloalkanol, arylalcohol, alkylene glycol, monoalkyl ether of polyoxyalkylene glycols or monoalkyl ether of alkylene glycols, or mixtures thereof.

In a preferred embodiment, the alcohol is selected from a $C_{1-6}$-alkanol, more preferably a $C_{1-4}$-alkanol, a mono-$C_{1-4}$-alkyl ether of a $C_{2-4}$-alkylene glycol, or a mixture thereof.

If the solvent comprises an ether, it is preferably selected from a dialkyl ether, a cycloaliphatic ether, an aryl ether or alkyl aryl ether, or mixtures thereof.

If the solvent comprises an ester, it is preferably selected from an alkyl ester, cycloalkyl ester, arylalkyl ester, alkylene glycol ester or mixtures thereof.

With regard to the homogeneity and optical quality of the coating produced from the composition, it may be advantageous when the solvent comprises two alcohols, ethers or esters with different boiling points.

The solvent preferably comprises a first alcohol, ether or ester with a boiling point S1 [in ° C.] and a second alcohol, ether or ester with a boiling point S2 [in ° C.], the boiling point S1 and the boiling point S2 differing such that either

S1/S2≥1.2 or

S1/S2≤0.8.

The solvent preferably comprises a $C_{1-4}$-alkanol as the first alcohol and a monoalkyl ether of an alkylene glycol, more preferably a mono-$C_{1-4}$-alkyl ether of a $C_{2-4}$-alkylene glycol as the second alcohol.

The weight ratio of the first alcohol to the second alcohol is preferably in the range from 5 to 0.01, more preferably in the range from 2 to 0.2.

The composition preferably also comprises water. In a preferred embodiment, the water is present in an amount of 2 to 15% by weight, based on the total weight of the composition.

In a preferred embodiment, the composition does not comprise any catalyst for the photopolymerization of epoxides.

Further optional components of the composition may include, for example, surface-active substances (for example to promote film formation), UV absorbers, dyes and/or stabilizers.

In one embodiment, the following composition is excluded from the invention: 36 parts trimethylolpropane triglycidyl ether, 162 parts 2-propanol, 264 parts 1-methoxy-2-propanol, 186 parts 3-glycidoxypropyltrimethoxysilane, 150 parts tetraethoxysilane, 240 parts of an $SiO_2$ nanosol, 126 parts water, 7.2 parts aluminium acetylacetonate, 25.2 parts 1M ammonium perchlorate solution and 3.6 parts of a flow agent, especially of a fluorosurfactant flow agent (the proportions of the respective components are parts by weight).

In a further aspect of the present invention, a process for coating a substrate is provided, comprising:

the provision of the above-described inventive composition, the application of the composition to the substrate, and the treatment of the substrate at a temperature in the range from 75° C. to 150° C. to cure the coating.

With regard to the preferred properties of the composition, reference may be made to the remarks made above.

For the coating process, it may be advantageous when the silanes of the formula (I) and/or (II), at the time of application to the substrate, already have a certain degree of crosslinking. A defined precondensation can be achieved, for example, by a hydrolysis of the silanes of the formula (I) and/or (II) catalysed with water or an aqueous organic or mineral acid.

The composition can be applied to the substrate by customary processes known to those skilled in the art.

Examples here may include dip-coating, spin-coating, spray-coating, flow-coating and slot die application.

Dip-coating can be used to apply the inventive composition even to surfaces of substrates with relatively complex geometry.

In the context of the present invention, it is possible to use a multitude of different substrates. It is possible, for example, to coat polymer substrates or else glass substrates with the inventive composition.

A suitable polymer substrate may, for example, comprise one or more of the following polymers: polycarbonate, poly(methyl)methacrylate, polyurethanes, polyamides, polydiethylene glycol bisallyl carbonate (CR39), polythiourethanes, for example MR-6, MR-7, MR-8, MR-10, MR-174.

The substrate to be coated preferably comprises those which are used in optical applications.

The substrate is preferably a lens for use as a plastic spectacle lens or magnifying glass.

The thermal treatment of the substrate is preferably effected at a temperature in the range from 75° C. to 150° C., more preferably in the range from 90° C. to 130° C.

In a further aspect of the present invention, an article is provided, comprising: a substrate and a coating on the substrate surface, the coating being obtainable or obtained by the above-described process.

With regard to the properties of the substrate and of the composition which is applied to the substrate and then crosslinked to obtain the coating, reference may be made to the remarks already made above.

In a further aspect, the present invention relates to the use of the above-described inventive composition for coating of a substrate.

With regard to suitable and preferred substrates, reference may be made to the remarks already made above.

Examples have been set forth below for the purpose of illustration and to describe the best mode of the invention at the present time. However, the scope of this invention is not to be in any way limited by the examples set forth herein.

EXAMPLES

Chemicals

Tetraethoxysilane and 3-glycidoxypropyltrimethoxysilane: Aldrich

IPA-ST: $SiO_2$ nanosol from Nissan Chemicals, Houston

FC4430: flow agent from 3M

Other chemicals and solvents, if unspecified, Aldrich.

Test of the Layer

The Bayer test for assessment of scratch resistance was conducted with a COLTS Bayer test unit and the corresponding method. A Bayer ratio of 1 means that the layer has the same scratch resistance as standardized CR39 glass. The higher the Bayer ratio, the higher the scratch resistance too.

The layer adhesion was measured by means of a cross-cut test. The results are graded 0 to 5, grade 0 being the best adhesive strength (no delamination) and grade 5 the worst (complete detachment).

Test of alkali resistance: coated glasses (−2.0 dioptres) were treated with ultrasound in an alkaline solution (pH>14) at 50° C. for 180 seconds. Layer thicknesses before and after the treatment were measured optically at the same site. The thickness of the hard layers was typically 2.5 μm. The alkali resistance is subsequently measured by the layer degradation: the lower the layer degradation, the better the alkali resistance.

In addition, the coatings were characterized with a nano-indenter. In such nano-indentation measurements, a diamond tip is pressed against the surface with rising force. The resolution of the z position here is in the nanometre range. In simplified terms, the limit for the first fall in the penetration force required is reported as the indentation hardness.

Compositions produced and tested (in the examples which follow, the proportions of the respective components are parts by weight.)

Example 1

(Noninventive): Base Formulation without Functional Additive 163 parts 3-glycidoxypropyltrimethoxysilane, 150 parts tetraethoxysilane and 200 parts IPA-ST were mixed in 134 parts 2-propanol, 221 parts 1-methoxy-2-propanol and 105 parts water, and the mixture was stirred at room temperature for 24 hours. Thereafter, 3.3 parts aluminium acetylacetonate, 20.9 parts 1M ammonium perchlorate solution and 3 parts FC4430 were added and the mixture was stirred for a further 3 hours. The resulting solution was filtered through a 5 μm filter and stored in a refrigerator prior to coating.

Example 2

Inventive 30 parts trimethylolpropane triglycidyl ether were dissolved in 134 parts 2-propanol and 221 parts 1-methoxy-2-propanol. 163 parts 3-glycidoxypropyltrimethoxysilane, 150 parts tetraethoxysilane, 200 parts IPA-ST and 105 parts water were added to the solution, and the mixture was stirred at room temperature for 24 hours. Thereafter, 3.3 parts aluminium acetylacetonate, 20.9 parts 1M ammonium perchlorate solution and 3 parts FC4430 were added and the mixture was stirred for a further 3 hours. The resulting solution was filtered through a 5 μm filter and stored in a refrigerator prior to coating.

Example 3

Inventive 30 parts 1,4-butanediol diglycidyl ether were dissolved in 134 parts 2-propanol and 221 parts 1-methoxy-2-propanol. 163 parts 3-glycidoxypropyltrimethoxysilane, 150 parts tetraethoxysilane, 200 parts IPA-ST and 105 parts water were added to the solution, and the mixture was stirred at room temperature for 24 hours. Thereafter, 3.3 parts aluminium acetylacetonate, 20.9 parts 1M ammonium perchlorate solution and 3 parts FC4430 were added and the mixture was stirred for a further 3 hours. The resulting solution was filtered through a 5 μm filter and stored in a refrigerator prior to coating.

Before dip-coating, the test substrates were activated with an aqueous-alkaline wash process and, after the coating, cured in an oven at 100° C. for 4 hours.

The coatings obtained with these compositions were tested with respect to their adhesive strength (cross-cut test) on different substrates, alkali resistance (determined via the degree of layer degradation) and their scratch resistance (Bayer test). The results obtained are shown in Table 1.

TABLE 1

Layer test results

| Coating | Epoxide compound of the formula (III) | Adhesive strength* | Layer degradation [μm] | Bayer value |
|---|---|---|---|---|
| Ex. 1 | No additive | CR39: 0.5; 0.5<br>MR7: 4, 4<br>MR8: 4, 4 | Complete layer degradation | 6.2 |
| Ex. 2 | Trimethylolpropane triglycidyl ether | CR 39: 0.5; 0.5<br>MR7: 0, 0<br>MR8: 0, 0 | 0.6 μm | 4.7 |
| Ex. 3 | 1,4-Butanediol diglycidyl ether | CR 39: 0.5; 0.5<br>MR7: 0.5; 0.5<br>MR8: 0.5; 0.5 | 0.6 μm | 7.5 |

Adhesive strength results: substrates, on the raised side, and hollow side

The results show that the inventive composition gives a coating with very good adhesive strength on different substrates and high scratch resistance with alkali resistance which is still sufficiently high.

In addition, the indentation hardness of the coating produced with the composition from Example 2 was determined and compared with indentation hardnesses of coatings which have been produced from commercial compositions (Comparative samples 1 to 4). Like the inventive composition, these commercial coatings are generally based on sol-gel chemistry.

The plot of the indentation hardnesses as a function of indentation depth is reproduced in FIG. 1.

The following can be inferred from FIG. 1:

Firstly, the indentation hardness of the inventive coating is well above (approx. 300 MPa) the hardnesses of the comparative samples.

Secondly, it is noticeable that the inventive coating is broken through only at much greater indentation depths (Ex. 2 at approx. 600 nm compared to approx. 250 nm for Comparative sample 2). In other words, the inventive coating has not only a high surface hardness but also a high hardness in penetration depths up to 600 nm.

The invention claimed is:

1. A composition configured to produce a coating using a single curing step, the composition comprising:
   (A) a first silane composition present in the composition in an amount of 5% by weight to 50% by weight wherein the first silane composition is chosen from the group consisting of:
   (a) a silane derivative of the formula (I)

in which:
R$^1$, R$^2$, R$^3$ and R$^4$, which may be the same or different, are selected from an alkyl, an acyl, an alkyleneacyl, a cycloalkyl, an aryl and an alkylenearyl, which may optionally be substituted,
(b) a hydrolysis product of the silane derivative of the formula (I);
(c) a condensation product of the silane derivative of the formula (I); and
(d) mixtures thereof;
(B) a second silane composition present in the composition in an amount of 5% by weight to 50% by weight wherein the second silane composition is chosen from the group consisting of:
(a) a silane derivative of the formula (II)

in which:
R$^5$ is an unsubstituted or substituted alkyl, acyl, alkyleneacyl, cycloalkyl, aryl or alkylenearyl group,
R$^6$ is an organic radical containing an epoxide group,
R$^7$ is an unsubstituted or substituted alkyl, cycloalkyl, aryl or alkylenearyl group,
n is 2 or 3;
(b) a hydrolysis product of the silane derivative of the formula (II);
(c) condensation product of the silane derivative of the formula (II); and
(d) mixtures thereof;
(C) a colloidal inorganic oxide, fluoride or oxyfluoride present in the composition in an amount of 5% by weight to 50% by weight;
(D) an epoxide compound having at least two epoxide groups present in the composition in an amount of 0.1% by weight to 10% by weight; and
(E) a catalyst system comprising: a Lewis acid and a thermolatent Lewis acid-base adduct present in the composition in an amount of 0.01% by weight to 5% by weight;
Wherein the weight % of the first silane composition to the second silane composition is a ratio from 2.3 to about 0.4, wherein the composition does not comprise a catalyst for the photopolymerization of epoxides, and wherein the composition does not include a dye.

2. The composition of claim 1, wherein the R$^6$ radical in the silane derivative of the formula (II) has the following formula (III):

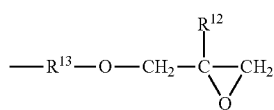

in which;
R$^{12}$ is hydrogen or C$_{1-4}$-alkyl and
R$^{13}$ is C$_{1-10}$-alkylene.

3. The composition of claim 2, wherein the inorganic oxide is selected from SiO$_2$, TiO$_2$, ZrO$_2$, SnO$_2$, Sb$_2$O$_3$, Al$_2$O$_3$, AlO(OH) or mixed oxides or mixtures or core-shell structures thereof, and the inorganic fluoride is MgF$_2$ which is optionally present in a core-shell structure with the inorganic oxide.

4. The composition of claim 3, wherein the epoxide compound is a polyglycidyl ether compound.

5. The composition of claim 2, wherein the epoxide compound is a polyglycidyl ether compound.

6. The composition of claim 1, wherein the inorganic oxide is selected from SiO$_2$, TiO$_2$, ZrO$_2$, SnO$_2$, Sb$_2$O$_3$, Al$_2$O$_3$, AlO(OH) or mixed oxides or mixtures or core-shell structures thereof, and the inorganic fluoride is MgF$_2$ which is optionally present in a core-shell structure with the inorganic oxide.

7. The composition of claim 6, wherein the epoxide compound is a polyglycidyl ether compound.

8. The composition of claim 1, wherein the epoxide compound is a polyglycidyl ether compound.

9. The composition of claim 8, wherein the polyglycidyl ether compound comprises a diglycidyl compound having the following formula (IV):

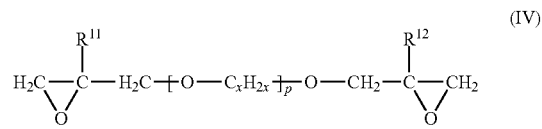

in which:
p is 0 or 1;
x=1-10; and
R$^{10}$ and R$^{11}$, which may be the same or different, are hydrogen or methyl.

10. The composition of claim 8, wherein the polyglycidyl ether compound comprises a triglycidyl ether compound having the following formula (V):

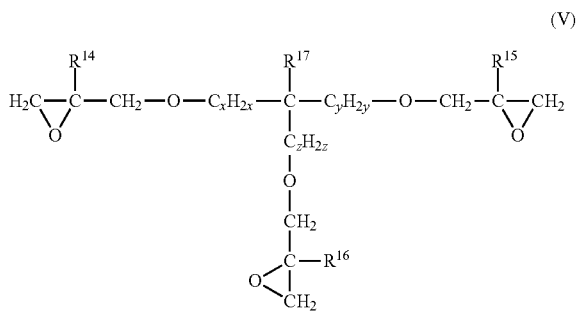

in which:
R$^{14}$, R$^{15}$ and R$^{16}$, which may be the same or different, are hydrogen or methyl,
R$^{17}$ is hydrogen or C$_{1-4}$-alkyl;
x=0-3;
y=0-3; and
z=0-3.

11. The composition of claim 10, wherein the epoxide compound of the formula (V) is selected from the group consisting of: trimethylolpropane triglycidyl ether, triglycidylglycerol, trimethylolethane triglycidyl ether, a prepolymer thereof, and a mixture thereof.

12. The composition of claim 11, wherein the Lewis acid is selected from the group consisting of: an ammonium salt, a metal salt of a metal from one of groups 1, 2 and 13 of the periodic table of the elements, a halide of an element of group 13 of the periodic table of the elements, an organic sulphonic acid or an amine salt thereof, a fluoride salt, an organotin compound and mixtures thereof.

13. The composition of claim 1, wherein the Lewis acid is selected from the group consisting of: an ammonium salt, a metal salt of a metal from one of groups 1, 2 and 13 of the periodic table of the elements, a halide of an element of group 13 of the periodic table of the elements, an organic sulphonic acid or an amine salt thereof, a fluoride salt, an organotin compound and mixtures thereof.

14. The composition of claim 13, wherein the thermolatent Lewis acid-base adduct is a metal complex.

15. The composition of claim 14, wherein the metal of the metal complex is selected from one of groups 6, 8, 12 and 13 of the periodic table of the elements.

16. The composition of claim 15, wherein the metal complex is selected from a metal enolate, a metal alkoxide, a metal acetate, and a mixture thereof.

17. The composition of claim 1, wherein the thermolatent Lewis acid-base adduct is a metal complex.

18. The composition of claim 1, wherein the composition further comprises a solvent chosen from the group consisting of an alcohol, an ether, an ester and mixtures thereof.

19. A process for coating a substrate comprising the steps of:
   providing a composition according to claim 1;
   applying the composition to a substrate; and
   treating the substrate at a temperature in the range from 75° C. to 150° C. to cure the coating.

20. An article comprising:
   a substrate; and
   a coating on the substrate surface, wherein the coating comprises the composition of claim 1.

* * * * *

UNITED STATES PATENT AND TRADEMARK OFFICE
CERTIFICATE OF CORRECTION

PATENT NO. : 9,957,398 B2
APPLICATION NO. : 13/644770
DATED : May 1, 2018
INVENTOR(S) : Norbert Hugenberg et al.

It is certified that error appears in the above-identified patent and that said Letters Patent is hereby corrected as shown below:

In the Specification

Column 4, Line 51:
"—$CH_2$—$CH_2$-acyl" should be — -$CH_2$-$CH_2$-acyl —

Column 7, Line 4:
"—$R^{10}$ and $R^{11}$" should be — $R^{11}$ and $R^{12}$ —

Column 11, Line 42:
"Inventive" should be — (inventive) —

Column 11, Line 58:
"Inventive" should be — (inventive) —

In the Claims

Column 14, Line 28:
"—$R^{10}$ and $R^{11}$" should be — $R^{11}$ and $R^{12}$ —

Signed and Sealed this
Fifteenth Day of January, 2019

Andrei Iancu
*Director of the United States Patent and Trademark Office*